April 8, 1969     J. D. COLE     3,437,386
SELF-ALIGNING BEARINGS
Filed May 11, 1967

United States Patent Office 3,437,386
Patented Apr. 8, 1969

3,437,386
SELF-ALIGNING BEARINGS
James D. Cole, 550 Chester Ave., Elgin, Ill. 60120
Filed May 11, 1967, Ser. No. 637,756
Int. Cl. F16c 9/06, 23/00
U.S. Cl. 308—72                              6 Claims

ABSTRACT OF THE DISCLOSURE

In abstract form, the invention consists of a self-aligning bearing for electric motors and the like, and embodies a spherical bearing member mounted for universal movement and having an opening to accommodate the armature shaft of the motor, and a correspondingly shaped bearing seat on said motor which is provided with a series of equidistantly spaced internal protuberances or rib-like projections against which said universally movable spherical member is yieldingly held in contactual engagement. The spherical member contacting the end portions and said rib-like projections extending in an axial direction.

---

The present invention relates to improvements in self-aligning bearings, and more particularly to a seating means for the spherical member of the self-aligning bearing.

One object of the invention is to provide a self-aligning bearing having a shaft supporting spherical member and to provide a seat for said member having raised portions at circumferentially spaced projections will not permit cocking or other misalignment of the spherical member.

Another object is to provide a bearing bracket for a self-aligning bearing particularly adapted for use on small electric miniature type motors for supporting the armature shaft and to provide a bearing bracket which can be easily and quickly attached to the motor casing.

Another object is to provide a die cast bearing bracket having a central opening provided with projections arranged in equidistantly circumferentially spaced relation one from the other, which projections or protuberances form spacing members for spacing the spherical member of the bearing a distance of approximately 1/100 of an inch so that channelways will be formed between the projections and prevent oil flooding on the shaft adjacent the bearing and prevent oil from flowing in a direction toward the end of the shaft and being thrown radially thereby.

Another object is to provide a die cast bearing bracket or the like having a central opening for accommodating the spherical member of the self-aligning bearing, and which is provided with a series of equally spaced projections forming channelways to allow air flow therethrough when the same is created axially across the bearing. Since oil is usually drawn out of the bearing in cases where a substantially round bearing opening is provided, poor lubrication results, and the passage of air between the bearing surfaces causes the oil to become polymerized and tacky.

Another object is to provide a bearing bracket for self-aligning bearings having at least three projections arranged in equidistantly spaced apart relation which can be easily burnished with the employment of relatively small forces and hence reduce the liability of distorting the bearing seat as well as portions of the bracket.

Other objects and advantages of the invention will become apparent during the course of the following description of the accompanying drawing forming a part of the application, wherein.

Figure 1:
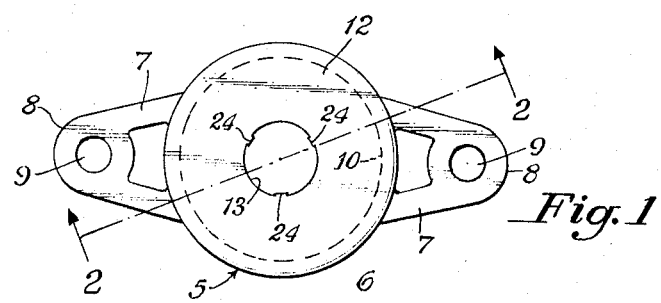
FIGURE 1 is a top elevational view of a die cast bearing bracket especially constructed for use in supporting the armature shaft of a miniature electric motor.
Figure 2:
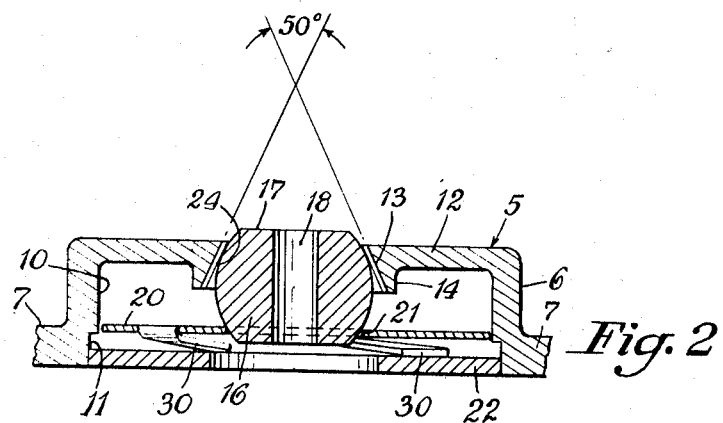
FIGURE 2 is a diametral cross sectional view taken on line 2—2 of FIGURE 1 and illustrating the bearing bracket slightly enlarged to emphasize the novel structural features thereof.
Figure 3:
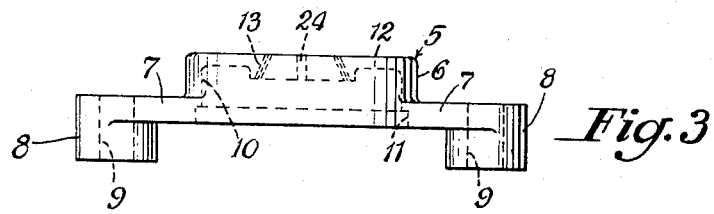
FIGURE 3 is a side elevational view of the bearing bracket.
Figure 4:
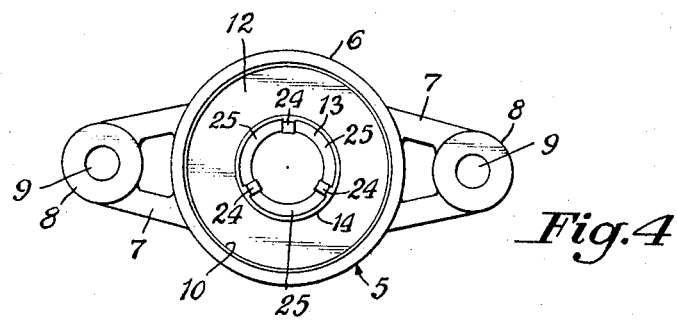
FIGURE 4 is a bottom plan view showing the arrangement of the equidistantly spaced projections for engaging the spherical component of the self-aligning bearing.

In the drawing, and more in detail, the reference character 5 will generally be employed to designate a die cast bearing bracket particularly intended for use in connection with self-aligning bearings for supporting the armature shaft of a miniature electric motor. The bearing bracket includes a body portion 6 which is preferably of round configuration and is provided with diametrically opposed projections 7 having spacer bosses 8 at the ends thereof. Openings 9 are provided in the wing-like projections 7 for accommodating threaded fasteners or the like. The round body portion 6 is formed with a recess 10 having an enlarged bore 11 adjacent its open end. Thus, the body portion 6 is formed with an end wall 12 in which there is formed a central opening 13.

The end closed wall 12 terminates adjacent the opening in an inwardly extending annular projecting portion 14 and the diameter of the opening 13 is of decreased size and slightly smaller than the spherical diameter of the ball component 16. The ball component 16 is of generally spherical shape but is flattened at its end as at 17 and is provided with a central bearing opening 18 for accommodating a bearing shaft of a miniature electric motor armature shaft.

The ball or spherical self-aligning bearing component is held within the recess 10 by means of a retaining disc 20 provided with a central opening 21 of a diameter slightly smaller than the overall diameter of the spherical member 16, and a backing plate 22 is received in the recess 11 and suitably anchored in place to secure the spherical member 16 in position with the axis of the bore 18 normal to the wall 12.

The opening 13 is formed with a series of equidistant circumferentially arranged rib-like projections 24 which have a thickness of approximately 7/100 of an inch and extend at an acute angle of approximately fifty degrees to each other. The rib-like projections 24 are of a thickness of approximately 1/100 of an inch to provide a corresponding space 25 between the spherical bearing element 16 and the opening 13. The rib-like projections are thus provided with inclined bearing surfaces which contactually support the spherical member 16 in spaced relation from the opening 13, and said rib-like projections extend from the inner edge of the annular rib 14 to the outer wall surface of the wall 12.

While the bearing bracket illustrated is provided with three equidistantly and circumferentially spaced projecting ribs 24 spaced at an angle of one hundred and twenty degrees one from the other, it is obvious that the opening 13 may be provided with a number of small projecting ribs in excess of the number shown.

As shown in the drawing the central opening 13 in the end wall 12 of the bearing bracket is inclined at an angle of approximately fifty degrees so that the included angle at diametral points of the opening 13 presents an annular clearance between the ribs 24, while the inner surface of the rib-like projections 24 presents an inclined surface extending at an angle of approximately twenty-five degrees with the bore axis of the opening 18. The annular spaces between the rib-like projections 24 are relatively small, but provide adequate space for the passage of air without forcing lubricant out of the space between the armature shaft and the bore 18. Additionally, the rib-like projections 24 can be made of any desired shape and the contacting points of the rib-like projections engage the spherical component 16 at circumferentially spaced points over a relatively small area so that the ball of the self-aligning bearing can move freely about a point along the axis of the bore 18 and in a plane intersecting said axis at a point midway between the end walls 17. Thus, the ball 16 may rock about the intersecting point on its true center. Since the inner surfaces of the rib-like projections 24 form straight line edges, it will be seen that the ribs contact the ball 16 at a single point. Thus reducing friction but yet maintaining the spherical member 16 in a true central position.

The backing plate 20 may be provided with struck out projections extending circumferentially for a portion of the circumference of the plate-like member 20 to form spring-like projections 30 which are likewise arranged in equidistantly spaced apart relation so that the free ends of the leaf spring portions will be engaged by the retaining plate 22 and yieldingly urge the spherical component of the self-aligning bearing into engagement with the contact surfaces of the rib-like projections 24.

It is to be understood that the form of the invention herewith shown and described is to be taken as a preferred embodiment thereof, and that the projections 24 can be in the form of small circumferentially spaced proturberances having rounded contact surfaces.

What I claim is:

1. A self-aligning bearing assembly comprising a bearing bracket with a central recess forming an end wall of said bracket, a central conical bore in said end wall and having its larger diameter in communication with said central recess, the conical wall of said central bore being provided with a plurality of equidistantly and circumferentially spaced longitudinally extending straight projecting ribs, a spherical member having a central cylindrical bore extending therethrough for the reception of a shaft, said spherical member projecting into the larger end of said conical bore with a portion of its spherical surface engaging said straight projecting ribs, and a yieldable retaining disc for engaging another portion of the spherical surface of said spherical member, said retaining disc being mounted in the open end of said central recess for yieldably urging said spherical member in constant engagement with said projecting ribs on said conical wall.

2. A self-aligning bearing assembly according to claim 1, in which the conical wall of said central bore in said end wall is inclined at an angle of approximately twenty-five degrees with respect to the axis of said central cylindrical bore extending through said spherical member.

3. A self-aligning bearing assembly according to claim 1, in which the straight ribs projecting from the conical wall of said central bore in said end wall are inclined at an angle of approximately twenty-five degrees with respect to the axis of said central cylindrical bore extending through said spherical member.

4. A self-aligning bearing assembly according to claim 1, in which said conical wall of said central bore in said end wall is provided with at least three equidistantly and circumferentially spaced straight projecting ribs extending axially along the entire length of said conical wall.

5. A self-aligning bearing assembly according to claim 1, in which said bearing bracket comprises a circular die cast body provided with said central recess and said end wall having said central conical bore, and diametrically opposed apertured wing-like projections extending outwardly from the circumference of said circular body, said apertures being arranged in fastener receiving cylindrical bosses at the outer ends of said wing-like projections.

6. A self-aligning bearing assembly according to claim 1, in which said projecting ribs on the conical wall of said central bore in said end wall are provided with rounded contact surfaces engaging the spherical surface of said spherical member.

References Cited

UNITED STATES PATENTS

| | | | |
|---|---|---|---|
| 634,204 | 10/1899 | Diehl. | |
| 1,109,625 | 9/1914 | Cooper | 308—72 X |
| 2,061,758 | 11/1936 | Eastman | 308—72 |
| 2,922,682 | 1/1960 | Abel | 308—132 |
| 2,931,477 | 5/1960 | Metzgar | 308—238 |
| 2,985,493 | 5/1961 | Dinsmore | 308—72 X |
| 3,070,409 | 12/1962 | Jakel | 308—72 X |
| 3,112,964 | 12/1963 | Matthey | 308—72 X |
| 3,301,610 | 1/1967 | Packett | 308—3.8 |
| 3,317,255 | 5/1967 | Wehlau | 308—37 |

MARTIN P. SCHWADRON, *Primary Examiner.*

LUCIUS L. JOHNSON, *Assistant Examiner.*